United States Patent [19]
Nagata et al.

[11] Patent Number: 4,839,883
[45] Date of Patent: Jun. 13, 1989

[54] OPTICAL INFORMATION RECORDING MEDIUM

[75] Inventors: Kenichi Nagata, Neyagawa; Noboru Yamada, Hirakata, both of Japan

[73] Assignee: Matsushita Electric Ind. Co., Ltd., Osaka, Japan

[21] Appl. No.: 66,229

[22] Filed: Jun. 25, 1987

[30] Foreign Application Priority Data

Jun. 30, 1986 [JP] Japan ................................. 61-153114
Jun. 30, 1986 [JP] Japan ................................. 61-153116

[51] Int. Cl.$^4$ .............................................. G11B 7/24
[52] U.S. Cl. .................... 369/286; 346/135.1; 369/100; 369/283; 369/288; 430/945
[58] Field of Search ............... 369/100, 275, 283, 284, 369/286, 288; 346/135.1; 430/19, 945

[56] References Cited

U.S. PATENT DOCUMENTS 4,578,684  3/1986  Gupta et al. ..................... 369/100
4,658,392  4/1987  Langowski et al. ............... 369/288

FOREIGN PATENT DOCUMENTS 0099208  1/1984  European Pat. Off. .
0119740  9/1984  European Pat. Off. .
2079031  1/1982  United Kingdom .

Primary Examiner—Steven L. Stephan
Attorney, Agent, or Firm—Stevens, Davis, Miller & Mosher

[57] ABSTRACT

There is provided a rewritable tri-layer optical information recording medium of the phase change type having a high sensitivity. In this medium, a reflective layer is formed by a thin film of an Ni-Cr alloy or an Au-Cr alloy.

16 Claims, 9 Drawing Sheets

OPTICAL INFORMATION RECORDING MEDIUM

BACKGROUND OF THE INVENTION

The present invention relates to an optical information recording medium of a phase-change type which can record, reproduce, erase, and rewrite information using a laser beam.

A certain kind of alloy consisting of Te (tellurium) as a base material has been known as a material which causes a reversible phase transition. For example, in the U.S. Pat. No. 3,530,441, S. R. Ovsinsky et al have disclosed for the first time that a thin film such as $Te_{85}Ge_{15}$, $Te_{81}Ge_{15}S_2Sb_2$, or the like causes a reversible phase transition in accordance with the irradiation of a high density energy of a laser beam or the like. Since then, an optical data recording medium in which an absorptive layer is formed by a material which causes a reversible phase transition is being developed.

On the other hand, in an optical information recording medium such as an optical disk or the like, there is a tendency such that the absorptive layer is made thin. A purpose of this tendency is to mainly reduce the heat capacity of the light irradiating portion and thereby to decrease an energy necessary for the recording and reproduction (i.e., to raise the sensitivity). At the same time, by effectively use the interference effect of the light, a change amount of the reflected light or the transmitted light before and after the recording of the optical information is increased, thereby obtaining a large signal (raising the S/N (signal-to-noise) ratio). It will be obviously understood that if the absorptive layer is merely made thin, the light absorbing efficiency in the absorptive layer decreases, so that the sensitivity deteriorates. Therefore, for example, a measure to improve the light absorbing efficiency in the absorptive layer is taken on the basis of the calculation due to the Matrix method or the like disclosed in O. S. Heavens, "Optical Properties of Thin Solid Films", page 69, issued by Dover Publications Inc., New Hork, in 1965. Practically speaking, for example, in the specification of U.K. Patent Publication No. 2079031, there has been disclosed a tri-layer optical information recording medium of the phase-change type such that a spacer layer is interposed between an absorptive layer and a reflective layer. The spacer layer functions to inhibit that an irreversible change occurs in the absorptive layer irradiated by a laser beam for recording or erasing. By forming the spacer layer, the operating life for repetitive operations of recording and erasing (i.e., a possible maximum number of times of repeating operations) is remarkably improved. The optimum values of the thicknesses of the spacer layer and absorptive layer are calculated by use of the foregoing Matrix method. The absorptive layer consists of a thin film of Chalcogenide alloy(s). The reflective layer consists of thin film of a metal such as Au, Al, or the like having a large optical reflectivity.

However, as the result of the study by the applicant of the present invention, it has been found that in the tri-layer optical information recording medium, when a rewritable optical disk was constituted by forming the absorptive layer consisting of a thin film of Chalcogenide alloy(s) and the reflective layer consisting of a thin film of Au and Al, in spite of the fact that the light absorbing efficiency in the absorptive layer is sufficiently high, the expected high sensitivity could not be obtained.

The reversible phase transition between the crystalline phase and the amorphous phase which appears in Chalcogenide alloy(s) or the like is caused by the thermal processes due to the light irradiation. Among these processes, in the process to crystallize the amorphous phase, it is necessary to keep a temperature above the crystallization temperature for a little while. However, in the case of the foregoing constitution, the heat generated by the light irradiation is mainly propagated through the reflective layer and can be easily diffused to the circumference. Consequently, the energy loss is large and the high sensitivity cannot be derived. Therefore, it is considered that if the reflective layer is formed by a thin film of a metal whose thermal diffusivity is lower than that of Au or Al, an optical information recording medium of the high sensitivity can be obtained.

In the specification of U.S. Pat. No. 4,578,684, there has been disclosed a tri-layer optical information recording medium using a thin film of simple body gold (Au), aluminum (Al), nickel (Ni), and chromium (Cr) as a reflective layer. However, as described in detail hereinbelow in the specification, even if the reflective layer was formed by the thin film of Ni and Cr, the sufficient sensitivity cannot be obtained. Namely, hitherto, in the foregoing tri-layer optical information recording medium, the advantage with the structure is not sufficiently effected and the drawback is emphasized.

SUMMARY OF THE INVENTION

It is an object of the present invention to provide a rewritable tri-layer optical information recording medium of the phase-change type whose sensitivity is higher than that in the conventional medium. To accomplish this object, an attention is paid to a material of the reflective layer and there is used a thin alloy film mainly containing Ni-Cr or Au-Cr whose thermal diffusivity is fairly smaller than that of a solid body metal such as Au, Al, Ni, Cr, or the like. A certain kind of thin alloy film can simultaneously satisfy a large optical reflectivity and a small thermal diffusivity. For example, when the reflective layer is formed of a thin film made of an Ni-Cr alloy or an Au-Cr alloy, in the case of irradiating the light, the thermal diffusion to the circumference in the light irradiated portion is reduced, thereby enabling the temperature of the absorptive layer to be efficiently raised. Therefore, in the absorptive layer, it is sufficient to set a small power density of a laser beam necessary to crystallize the amorphous phase and an optical information recording medium of the high sensitivity is obtained.

DESCRIPTION OF THE PREFERRED EMBODIMENTS

Figure 1A:
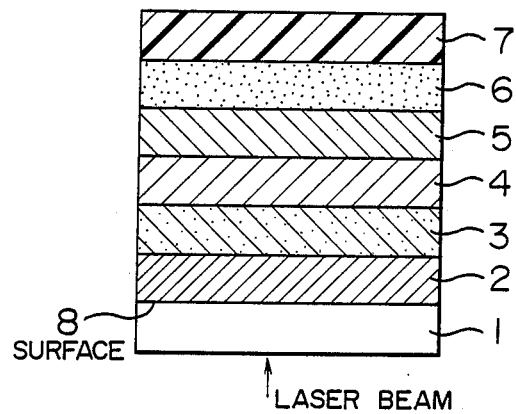
FIGS. 1A to 1C are cross sectional views showing a structure of an embodiment of a reversible optical information recording medium according to the present invention.
Figure 1B:
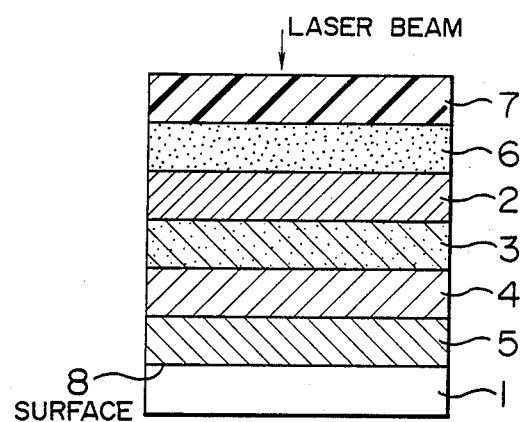
Figure 1C:
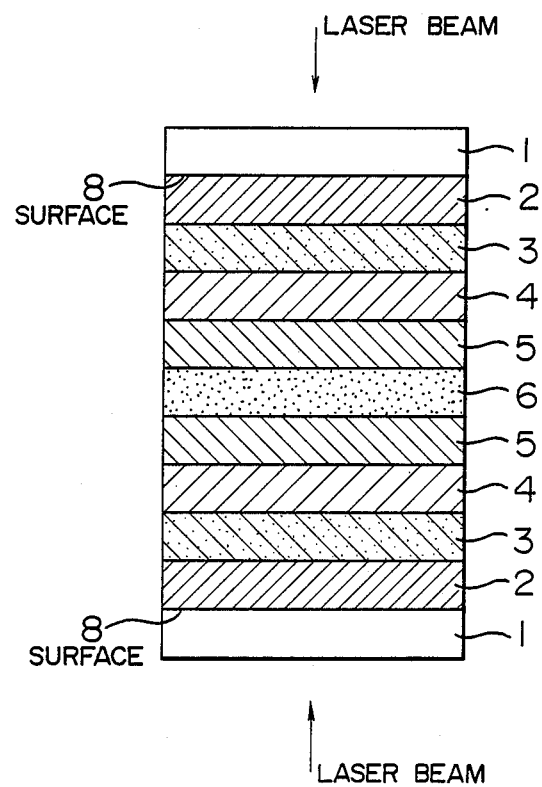

FIGS. 1A to 1C show an example of a constitution of an optical information recording medium according to the present invention. FIG. 1A shows an example in which the light enters from the side of a protective substrate 7. FIG. 1B shows an example in which the light enters from the side of a substrate 1.

Although FIGS. 1A and 1B fundamentally have the same constitution, there are slight differences of the substrates, materials of respective layers, their manufacturing methods, and the like because of the difference of the positional relationship among the substrate and the respective layers and of the difference of the order to form the respective layers on the substrate.

A substrate such as a plastic material made of PMMA (polymethylmethacrylate), polycarbonate, or the like, glass, or the like which has a smooth surface and is ordinarily used for an optical disk may be used as the substrate 1. In the case of the substrate of the type shown in FIG. 1A, the substrate is not necessarily transparent but a metal plate or ceramics plate having a smooth surface may be used. In the case of the optical disk, in order to lead a laser beam, a surface 8 of the substrate 1 is ordinarily covered by spiral or concentric tracks.

Dielectric layers made of $SiO_2$, $Al_2O_3$, ZnS, ZnSe, or the like may be used as protective layer 2 and a spacer layer 4. These layers function to prevent that an absorptive layer 3 is thermally damaged when the recording and erasing operations are repeatedly performed. On the other hand, those layers function to raise the light absorbing efficiency into the absorptive layer by use of the foregoing multiple interference effect and at the same time to obtain a high S/N (signal-to-noise) ratio by increasing the change amounts of the reflected lights or transmitted lights before and after the recording.

In the case of the rewritable optical disk, as a material of the absorptive layer 3, it is possible to use a material such as an Chalcogenide alloy mainly consisting of, e.g., Te and Se, or the like which causes a reversible structural change on the basis of the thermal processes between the crystalline phase and the amorphous phase, or a material mainly consisting of a rare earth element and a transition metal element which are used in a magneto optic recording medium, or the like.

The protective substrate 7 is formed by spin coating a resin or plastic material or by coupling a plastic material plate, a metal plate, or the like similar to the substrate 1 by use of an adhesive 6.

A film thickness of each layer can be accurately determined by the Matrix method.

Further, as shown in FIG. 1C, two sets of recording media are coupled using the adhesive 6 such that the reflective layers are arranged inside. Thus, it is possible to obtain a constitution such that information can be recorded, reproduced, and erased into and from both sides.

The present invention is characterized by a reflective layer. A reflective layer 5 is formed of a thin Ni-Cr alloy film or a thin Au-Cr alloy film.

In the optical information recording medium of the invention, the fundamental idea to constitute the reflective layer and the factor to decide the practical component elements will now be described hereinbelow.

Figure 2A:
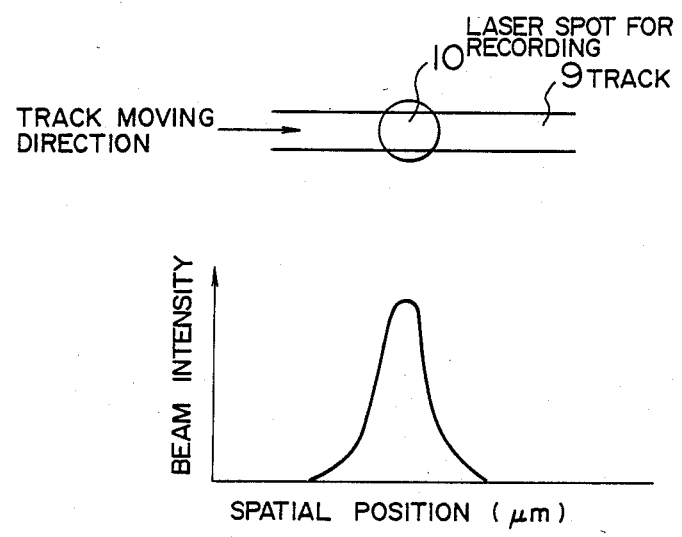
FIGS. 2A and 2B are diagrams showing the relations among the shape of a laser spot for use in recording and erasing, the power distribution, and the change in temperature of the light irradiated portion of the recording medium in an embodiment in which the optical information recording medium of the invention is applied to an optical disk.
Figure 2A:
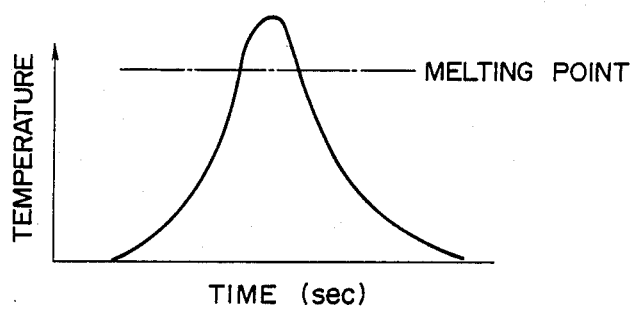
Figure 2B:
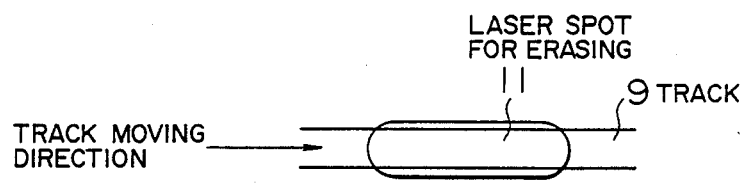
Figure 2B:
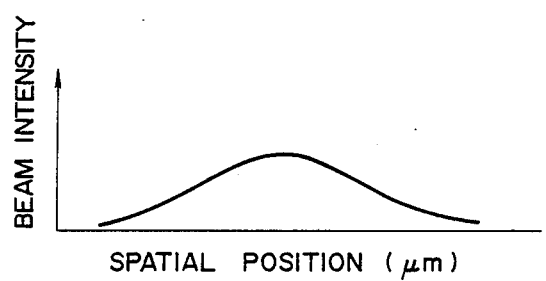
Figure 2B:
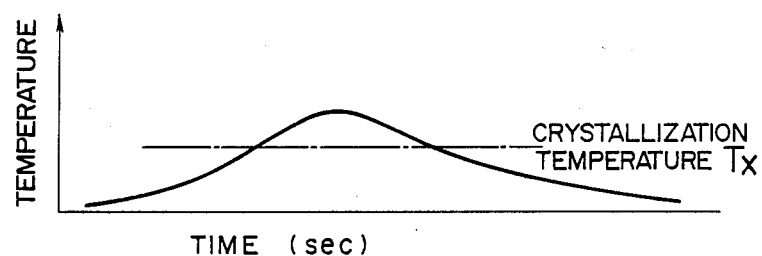

FIGS. 2A and 2B show the shape and intensity distribution of a laser spot necessary to record and erase a signal into/from a phase-change material to be rotated and also show a change in temperature at a point on a track 9 when the laser spot passed. FIG. 2A shows a laser spot 10 which is used in the recording, namely, in the phase transition from the crystalline phase to the amorphous phase. Assuming that the light emitting wavelength is 800 nm, the laser spot converged to a size near the diffraction limit is set to a circle having a diameter of about 1 μm at the width of the half value of the intensity and this intensity has the Gaussian distribution. Therefore, when one track on the rotating disk traverses on the laser spot, the temperature of the light irradiated portion promptly increases and instantaneously exceeds the melting point of the material of the absorptive layer. However, after the spot has passed, the heat is rapidly diffused to the circumference and the light irradiated portion is cooled before the liquid phase is crystallized, so that it becomes amorphous. It should be noted in this case that the time when the laser beam is actually irradiated is very shorter than the time required for the thermal diffusion and the ratio at which the heat generated during this period of time is diffused to the circumference is small. Namely, in the recording mode, an increase in light absorbing efficiency in the absorptive layer results in the improvement of the sensitivity. This means that as a reflective layer, it is advantageous to use a film whose light reflectivity is as large as possible, for example, a thin metal film made of Au, Al, or the like.

On the other hand, FIG. 2B shows a laser spot 11 which is used in the erasing, namely, in the phase transition from the amorphous phase to the crystalline phase. In this case, the spot having a shape which is longer in the track direction than that in the recording mode is used. The intensity also has the Gaussian distribution. However, the energy density in the central portion is not so extremely high as in the laser spot for use in the recording. Therefore, when the recorded track on the rotating disk traverses on the laser spot, the temperature of the light irradiated portion relatively gradually increases and exceeds the crystallization temperature and is held as it is for a little while. Then, the irradiated portion is relatively slowly cooled and the recorded portion (the amorphous portion) is crystallized. Namely, the recorded signal is erased. It should be noted in this case that in the light irradiated portion, the heat diffusion to the circumference progresses for the period of time when the light is actually being irradiated to this portion and in the erasure process, similarly to the light absorbing efficiency in the absorptive layer, the thermal diffusion efficiency to the circumference must be also considered. In the optical disk of the constitution of FIG. 1, the reflective layer functions as what is called a heat sink. Namely, an escape amount of heat is largely influenced by the material constituting the reflective layer. For example, Au and Al are well-known as a metal having a high thermal diffusivity. The use of these thin films as the reflective layers is disadvantageous in the erasure process.

Ni and Cr are known as solid body metals which have a relatively small thermal diffusivity and can easily form a thin film and hardly rust. The thermal properties of those metals at 300° K. were compared with those of Au, Al, Ni-Cr alloy, and Au-Cr alloy (Table 1).

TABLE 1

Thermal Diffusivities of Metals
(From "The TPRC data series", Vols. 1, 4, 10)

| Item | Material | | | | |
|---|---|---|---|---|---|
| | Au | Ni | Cr | $Ni_{60}Cr_{40}$ | $Au_{94}Cr_6$ |
| Thermal conductivity $\lambda$ (W/cm·k) | 3.0 | 0.6~0.8 | 0.9 | 0.11 extrapolation value | 0.15~0.2 |
| Specific heat C (cal/gr·k) | 0.03 | 0.11 | 0.11 | 0.11 | ~0.035 extrapolation value |
| Density $\rho$ (gr/cm³) | 19.3 | 8.9 | 7.2 | ~8.2 | ~19.1 |
| Thermal diffusivity $\lambda/c\cdot p$ (cm²/sec) | 1.2 | 0.15~0.2 | 0.27 | 0.03 | 0.05~0.07 |

It will be understood from Table 1 that the thermal diffusivities of Au and Al are larger than those of Ni and Cr by nearly one digit and the thermal diffusivities of Ni-Cr alloy and Au-Cr alloy are further smaller than those of Ni and Cr. Namely, it will be easily presumed that when the reflective layers were formed using Ni-Cr alloy and Au-Cr alloy, the optical information recording medium having the excellent erasing sensitivity can be obtained.

The ground of limitation of the compositions of the Ni-Cr alloy and Au-Cr alloy of the invention and the ground of limitation of the film thicknesses will be further described hereinbelow with respect to practical examples.

EXAMPLE 1

Figure 3:
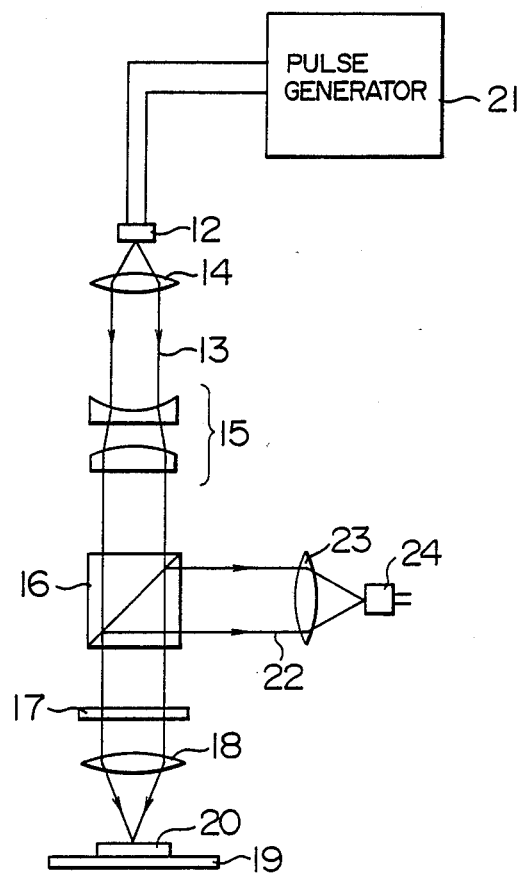
FIG. 3 shows a measuring apparatus to examine the characteristics of the optical information recording medium of the invention.

A static evaluating apparatus having such a constitution as shown in FIG. 3 was used as means for vertifying the validity of the reflective layer made of an Ni-Cr alloy. In the constitution of FIG. 1A, only the reflective layer was variably changed and the recording and erasing sensitivities of the test pieces were examined by use of the foregoing evaluating apparatus. The test piece was formed by adhering the same polycarbonate material as the substrate on the substrate of the polycarbonate resin by use of a ZnS layer of a thickness of 900 Å, a quarternary system absorptive layer of $Te_{45}Ge_{15}Se_{10}Sb_{30}$ of a thickness of 400 Å (refer to Japanese Patent provisional Publication No. 73438/87), a ZnS layer of a thickness of 1700 Å, a reflective layer, and further a modacrylic resin. In the case of the Au reflective layer, the film thickness of reflective layer was set to 200 Å. In the case of the reflective layers of Ni, Cr, and Ni-Cr alloy, the film thicknesses of the reflective layers were set to 500 Å. Each of the layers was formed by the evaporation technique using an electron beam. In the case of the multi-element film, the sources and electron guns as many as the number of elements were prepared. The rate of each element was individually controlled. Thus, desired compositions were obtained.

In FIG. 3, a light 13 emitted from a semiconductor laser (or laser diode) 12 is converted into a parallel light by a first lens 14 and thereafter, it is shaped to a circular beam by a second lens system 15. The laser beam is transmitted through a beam splitter 16 and a quarter wavelength plate 17 and is converged by a third lens 18. The converged beam is irradiated onto a test piece 20 put on an XY stage 19. In this case, the semiconductor laser is directly driven by a pulse generator 21. An irradiation power and irradiation time are arbitrarily selected and a change on the test piece is examined. A change in laser irradiated portion is detected in the following manner. Namely, the laser beam is irradiated by weakening the laser power before and after the recording. A reflected light 22 is led to a fourth lens 23 through the lens 18 and beam splitter 16 and is focused onto a photo detector 24. A change in output of the photo detector 24 is detected.

In the case where, for example, the irradiation power was changed while maintaining the laser irradiation time constant, the recording sensitivity (crystalline-to-amorphous phase transition) can be defined by the irradiation laser power at which the recording is started. An example of the result of the measurement is shown in Table 2.

TABLE 2

Recording sensitivity when using an Ni—Cr alloy

| Material composition | Irradiation time | |
|---|---|---|
| | 0.1 μs | 0.2 μs |
| Ni | 14 mW | 10 mW |
| $Ni_{90}Cr_{10}$ | 14 mW | 11 mW |
| $Ni_{80}Cr_{20}$ | 14 mW | 11 mW |
| $Ni_{60}Cr_{40}$ | 15 mW | 11 mW |
| $Ni_{40}Cr_{60}$ | 15 mW | 11 mW |
| $Ni_{20}Cr_{80}$ | 15 mW | 11 mW |
| $Ni_{10}Cr_{90}$ | 15 mW | 11 mW |
| Cr | 15 mW | 11 mW |
| Au | 12 mW | 9 mW |

It will be understood from Table 2 that when the irradiation time was limited, in the case of a sample using the thin Ni-Cr alloy film as a reflective layer, the recording sensitivity hardly depends on the concentration of Cr in the material of the reflective layer.

On the other hand, the erasing sensitivity (amorphous-to-crystalline phase transition) is considered to be high as the erasing time required to erase is short and, therefore, it may be also called an erasing speed. For example, when the irradiation time was changed while keeping the irradiation power constant, the erasing sensitivity can be defined by the shortest irradiation time at which the crystallization is started. An example of the result of the measurement is shown in Table 3.

TABLE 3

Erasing speed when an Ni—Cr alloy is used

| Material composition | Irradiation time | |
|---|---|---|
| | 2 mW | 4 mW |
| Ni | 4 μs | 0.5 μs |
| $Ni_{90}Cr_{10}$ | 3.5 μs | 0.3 μs |
| $Ni_{80}Cr_{20}$ | 2 μs | 0.2 μs |
| $Ni_{60}Cr_{40}$ | 2 μs | 0.2 μs |
| $Ni_{40}Cr_{60}$ | 2 μs | 0.2 μs |
| $Ni_{20}Cr_{80}$ | 2 μs | 0.2 μs |
| $Ni_{10}Cr_{90}$ | 3.5 μs | 0.3 μs |
| Cr | 4 μs | 0.5 μs |

TABLE 3-continued

| | Erasing speed when an Ni—Cr alloy is used | |
|---|---|---|
| Material composition | Irradiation time | |
| | 2 mW | 4 mW |
| Au | 12 μs | 1.0 μs |

It will be understood from Table 3 that when the irradiation power was limited, particularly, when the power is small, the sample in which an Ni-Cr alloy having a Cr concentration of 10 to 90% is used as a reflective layer has the higher erasing speed than that of the sample in which Au, Ni, or Cr is used as a reflective layer, and in particular, the sample having a Cr concentration within a range of 20 to 80% has the highest erasing speed.

Namely, in the case of the sample using an Ni-Cr alloy, it has been confirmed that by setting a Cr concentration ration to a value within a range of 10 to 90%, preferably 20 to 80%, the high recording and erasing sensitivities can be derived.

The factor to decide the film thickness of the reflective layer of an Ni-Cr alloy will now be explained.

EXAMPLE 2

As mentioned above, the factor to determine the recording sensitivity is an amount of light which is absorbed into the absorptive layer and it is decided by the reflectivity in the relevant wavelength of the reflective layer.

Figure 4A:
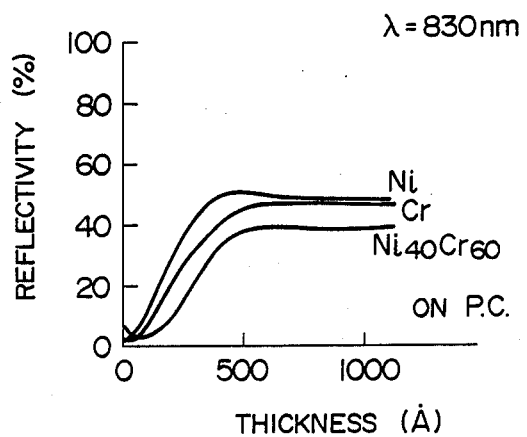
FIGS. 4A and 4B are characteristic diagrams showing the differences of the reflectivities between the Ni-Cr alloy reflective layer of the invention and another reflective layer for the film thicknesses.
Figure 4B:
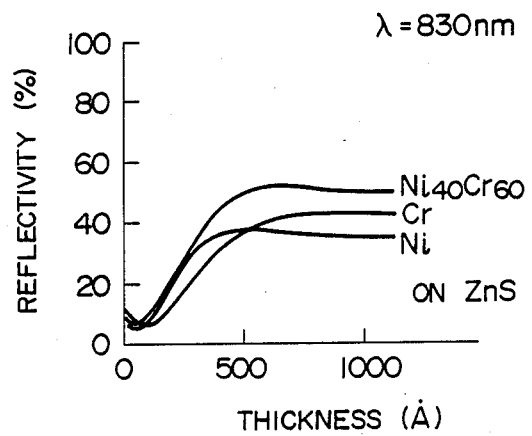

FIGS. 4A and 4B show the relations between the film thickness of the foregoing metals and the reflectivities. FIG. 4A shows a graph when the film was directly formed on the polycarbonate substrate. FIG. 4B shows a graph when the film was formed on the ZnS substrate.

Table 4 shows the result of the examination of the relations among the optical constants when the compositions of the Ni-Cr alloy of a thickness of 500 Å were changed and the reflectivities on, e.g., the ZnS substrate.

TABLE 4

| | Reflectivity of an Ni—Cr alloy | | |
|---|---|---|---|
| | Item | | |
| Composition (at %) | Index of reflection (n) | Extinction coefficient (k) | Reflectivity |
| Ni | 4.2 | 4.3 | 38% |
| $Ni_{90}Cr_{10}$ | 3.8 | 4.3 | 38% |
| $Ni_{80}Cr_{20}$ | 3.4 | 4.3 | 38% |
| $Ni_{60}Cr_{40}$ | 3.1 | 4.2 | 38% |
| $Ni_{40}Cr_{60}$ | 2.9 | 4.1 | 37% |
| $Ni_{20}Cr_{80}$ | 2.6 | 4.0 | 37% |
| $Ni_{10}Cr_{90}$ | 2.3 | 3.8 | 36% |
| Cr | 1.9 | 3.6 | 36% |

It will be understood from FIGS. 4A and 4B and Table 4 that the reflectivity of the thin Ni-Cr alloy film does not depend on the Cr concentration.

It will be appreciated from FIGS. 4A and 4B and Table 4 that the reflectivity of the Ni-Cr alloy layer changes in dependence on the film thickness and is saturated when the film thickness has a value within a range of 400 to 600 Å and sufficiently exceeds 50% of the saturation value when the film thickness is about 300 Å. Therefore, it is considered that by setting the film thickness of the Ni-Cr alloy layer to be slightly thick, the light absorbing efficiency in the absorptive layer rises and the sensitivity is improved. However, it is also considered that the heat capacity of the reflective layer simultaneously becomes too large, so that the temperature of the absorptive layer becomes difficult to increase and the sensitivity contrarily deteriorates. Therefore, the sample pieces which had been described in the Example 1 were prepared, the compositions of the reflective layer were fixed to $Ni_{40}Cr_{60}$, and the sensitivities were compared using the film thickness as a parameter in order to determine the optimum film thickness of the reflective layer.

Figure 5A:
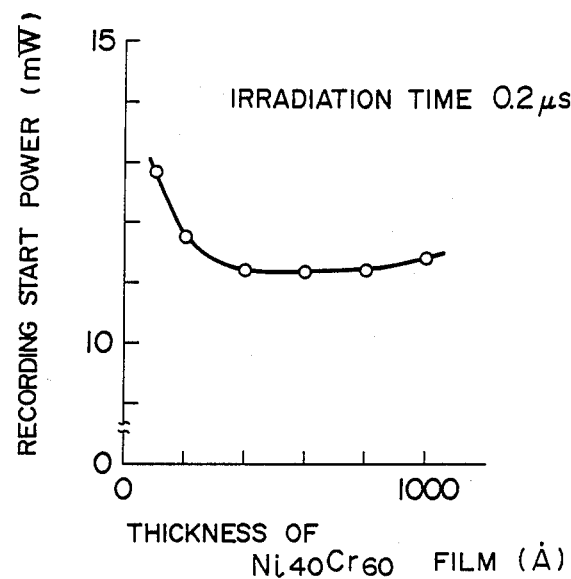
FIGS. 5A and 5B are diagrams showing the relations among the film thickness of the Ni-Cr alloy reflective layer of the invention and the recording and erasing sensitivities.
Figure 5B:
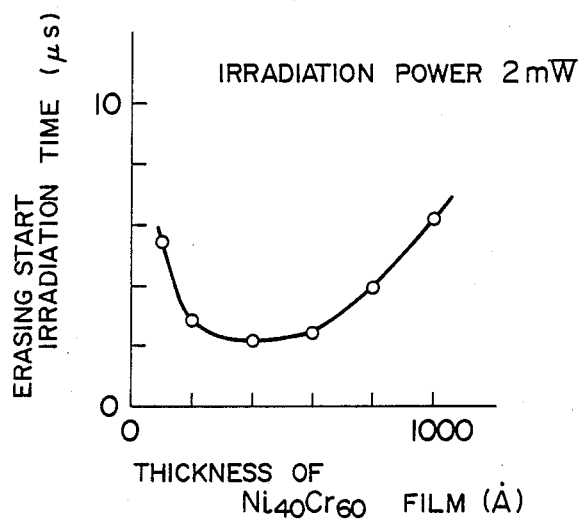

FIGS. 5A and 5B show the results of those experiments. For example, as shown in FIG. 5A, when the irradiation pulse width was set to 0.2 μsec., the recording start power was substantially saturated when the film thickness is 400 Å and is not reduced at film thicknesses above 400 Å. On the other hand, as shown in FIG. 5B, it will be understood that when the irradiation power was set to 2 mW, there is a tendency such that the erasing start irradiation time increases with an increase in film thickness and this time is influenced by the heat capacity.

Namely, it has been found that by setting the film thickness to a value within a range of 200 to 600 Å, the recording and erasing sensitivities can be also held high. This tendency also appeared even when the concentration of Cr as a composition of the Ni-Cr alloy was set to a value within a range of 20 to 80%.

EXAMPLE 3

A disk having a reflective layer made of an Au layer or an Ni-Cr alloy layer was formed. The repeating characteristics of the recording and erasing of this disk were examined. The optical disk was formed in a manner such that a ZnS layer, an absorptive layer, a ZnS layer, and a reflective layer of Au or $Ni_{40}Cr_{60}$ were sequentially laminated on a polycarbonate resin substrate of a diameter φ of 130 mm and a thickness of 1.2 mm and having guide tracks of the light, and a protective substrate was adhered on these layers using an ultra-violet light cured resin. Thicknesses of the respective layers were set to about 900 Å, 400 Å, 1700 Å, 200 Å (in the case of the Au layer) or 400 Å (in the case of the $Ni_{40}Cr_{60}$ layer) in accordance with the order from the bottom. The optical disk was designed so as to raise the light absorbing efficiency in the absorptive layer. A laser beam enters from the substrate side. A dynamic tester used to dynamically evaluate the optical disk has a circular laser spot of a diameter φ of 0.9 μm for recording and an elliptic laser spot of 1×8 μm for erasing, and these two spots are continuously arranged in one optical head. The peripheral speed was set to 5 m/sec. and the recording and erasing sensitivities and the repetitive operation life were examined. The repetitive life limit was defined as the number of times at which the C/N ratio is reduced by 3 dB from the initial C/N ratio and the following results were obtained.

(1) The recording power at which the C/N ratio is above 50 dB was above about 6 mW in the case of using the Au reflective layer and was above about 7 mW in the case of using the reflective layer of an Ni-Cr alloy. The reason why the recording sensitivity of the constitution using the Au reflective layer is better than that of the constitution using the reflective layer of the Ni-Cr alloy is because the reflectivity of the Au reflective layer is larger as mentioned above.

(2) When the recording power at which the C/N ratio is above 50 dB was selected, the erasing power necessary to set the erasing ratio to be about 40 dB was above about 12 mW in the case of using the Au reflective layer and was above about 8 mW in the case of using the reflective layer of the Ni-Cr alloy.

(3) When the recording and erasing operations were repeatedly performed under the power condition such that the C/N ratio is above 50 dB and the erasing ratio is above 40 dB, the repetitive life of above hundred thousands times was confirmed in both cases where the Au reflective layer was used and where the reflective layer of the Ni-Cr alloy was used.

(4) The results of the above items (1) to (3) were not changed even if a concentration of Cr as a composition of the Ni-Cr alloy was set to a value within a range of 20 to 80%.

As will be understood from the above results, in the optical disk with the constitution explained in the Example 3, the irradiating beam in the erasure process needs an energy larger than that of the irradiating beam in the recording process. Therefore, it is advantageous to use the reflective layer of the Ni-Cr alloy as the reflective layer rather than the use of the Au reflective layer because the recording and erasing operations can be repeatedly performed with a lower power as a total power.

EXAMPLE 4

The environment test was performed using the optical disk with the constitution shown in the Example 3. In each disk, the signal was recorded into the tracks into and from which the recording and erasing operations had been repeatedly performed hundred thousand times and the C/N ratio was measured. Next, this disk was put in the air conditioned room at 80° C. and 80% RH. The disk was taken out of this room after two months and the C/N ratio was again measured. Thus, even in the case of the reflective layer made of the thin Au film and in the case of the reflective layer made of the thin Ni-Cr alloy film, the change in C/N ratio was so small to be −0.5 to −1.5 dB that it can be ignored.

The ground to limit the composition and the ground to limit the film thickness with respect to the reflective layer formed of the thin Au-Cr alloy film of the invention will now be described.

EXAMPLE 5

As mentioned above, the factor to determine the recording sensitivity is an amount of light which is absorbed in the absorptive layer and this amount is decided by the reflectivity at the relevant wavelength of the reflective layer.

Figure 6A:
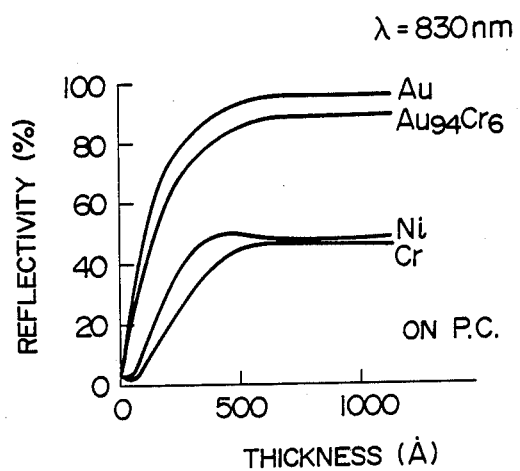
FIGS. 6A and 6B are characteristic diagrams showing the differences of the reflectivities between the Au-Cr alloy reflective layer of the invention and another reflective layer for the film thicknesses.
Figure 6B:
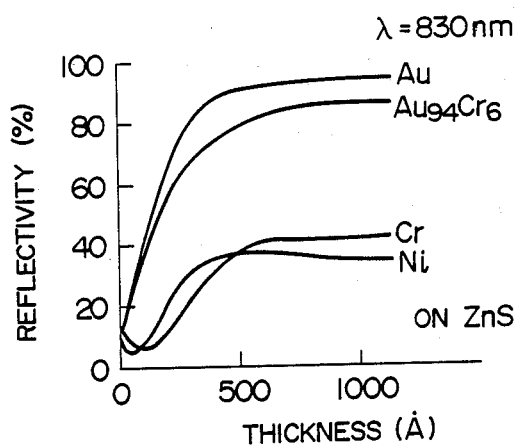

FIGS. 6A and 6B show the relations among the film thicknesses of the foregoing metals and the reflectivities. FIG. 6A shows a graph in the case where the film was directly formed on the polycarbonate substrate. FIG. 6B shows a graph in the case where the film was formed on the ZnS substrate. As the result of the further detailed examination, it has been found that in any of the films made of Au, Ni, Cr, and Au-Cr alloy, when the film thickness was 500 Å, the reflectivity has reached a value above 90% of the saturation value.

Table 5 shows the results of the examination of the relations among the optical constants in the case where the compositions of the Au-Cr alloy of a thickness of 500 Å were changed and the reflectivities on, e.g., the ZnS substrate.

TABLE 5

Reflectivity of an Au—Cr alloy

| Composition (at %) | Index of reflection (n) | Extinction coefficient (k) | Reflectivity |
|---|---|---|---|
| Au | 0.20 | 5.25 | 92% |
| $Au_{96}Cr_4$ | 0.4 | 5.0 | 84% |
| $Au_{94}Cr_6$ | 0.6 | 5.3 | 81% |
| $Au_{92}Cr_8$ | 0.8 | 5.1 | 75% |
| $Au_{90}Cr_{10}$ | 0.9 | 5.2 | 73% |
| $Au_{88}Cr_{12}$ | 1.1 | 5.1 | 68% |
| $Au_{85}Cr_{15}$ | 1.4 | 5.3 | 65% |
| $Au_{80}Cr_{20}$ | 1.7 | 5.1 | 59% |
| $Au_{75}Cr_{25}$ | 2.1 | 4.9 | 52% |
| $Au_{70}Cr_{30}$ | 2.6 | 4.5 | 43% |
| Cr | 1.9 | 3.6 | 36% |

It will be presumed from FIG. 6 and Table 5 that when a concentration of Cr as a composition of the Au-Cr alloy was set to a value below 20%, the sufficiently high reflectivity is obtained, and further when it was set to a value below 25%, the same or better reflectivity than those in the case of Ni and Cr is derived, i.e., the high recording sensitivity is derived.

EXAMPLE 6

The static evaluating apparatus with the constitution shown in FIG. 3 were used as the means for verifying the content of the Example 5. Only the reflective layer was variably changed in the constitution of FIG. 1A and the recording and erasing sensitivities of the test pieces were examined using the above evaluating apparatus. The test piece was formed in a manner such that a ZnS layer of a thickness of 900 Å, a quarternary system absorptive layer of $Te_{45}Ge_{15}Se_{10}Sb_{30}$ of a thickness of 400 Å, a ZnS layer of a thickness of 1700 Å, and a reflective layer were sequentially laminated on the substrate of the polycarbonate resin, and further the same polycarbonate material as the substrate was adhered to this laminate using the modacrylic resin. The film thickness of the reflective layer was set to 200 Å in the case of the Au reflective layer and to 500 Å in the case of the reflective layers of Ni, Cr, and Au-Cr alloy.

Tables 6 and 7 show examples of the results of the measurement.

TABLE 6

Recording sensitivity when an Au—Cr alloy is used

| Material composition | Irradiation time | | |
|---|---|---|---|
| | 0.1 μs | 0.2 μs | 0.5 μs |
| Au | 12.0 mW | 9.0 mW | 6.0 mW |
| $Au_{98}Cr_2$ | 12.0 mW | 9.0 mW | 6.0 mW |
| $Au_{94}Cr_6$ | 12.0 mW | 9.0 mW | 6.0 mW |
| $Au_{90}Cr_{10}$ | 12.2 mW | 9.2 mW | 6.0 mW |
| $Au_{85}Cr_{15}$ | 12.4 mW | 9.4 mW | 6.0 mW |
| $Au_{80}Cr_{20}$ | 12.6 mW | 9.7 mW | 6.3 mW |
| $Au_{70}Cr_{30}$ | 13.0 mW | 10 mW | 6.7 mW |
| Cr | 15.0 mW | 11 mW | 7.5 mW |

TABLE 7

Erasing speed when an Au—Cr alloy is used

| Material composition | Irradiation time | |
|---|---|---|
| | 2 mW | 4 mW |
| Au | 12 μs | 1.0 μs |
| $Au_{98}Cr_2$ | 8 μs | 0.7 μs |
| $Au_{94}Cr_6$ | 6.5 μs | 0.6 μs |
| $Au_{90}Cr_{10}$ | 5 μs | 0.6 μs |
| $Au_{85}Cr_{15}$ | 4.5 μs | 0.5 μs |

TABLE 7-continued

Erasing speed when an Au—Cr alloy is used

| Material composition | Irradiation time | |
|---|---|---|
| | 2 mW | 4 mW |
| $Au_{80}Cr_{20}$ | 4.3 μs | 0.5 μs |
| $Au_{70}Cr_{30}$ | 4 μs | 0.5 μs |
| Cr | 4 μs | 0.5 μs |

It will be understood from Table 6 that when the irradiation time was limited, in particular, in the case of the short irradiation time, the recording sensitivity of the sample using the reflective layer of the Au-Cr alloy is higher than that of the samples using the Cr and Ni reflective layers, and especially, when the Cr concentration is below 20%, the highest recording sensitivity is obtained.

It will be understood from Table 7 that when the irradiation power was limited, particularly, in the case of a small power, the erasing speed of the sample using the reflective layer made of the Au-Cr alloy is faster than those of the samples using the Au, Ni, and Cr reflective layers and, especially, when the Cr concentration was set to a value above 10%, the highest erasing sensitivity is obtained.

Namely, it has been found that by setting Cr concentration in the Au-Cr alloy to a value within a range of 2 to 30%, preferably, 10 to 20%, the high recording and erasing sensitivities were derived.

The factor to determine the film thickness of the reflective layer of the Au-Cr alloy will now be described.

EXAMPLE 7

It will be understood from FIGS. 6A and 6B that the reflectivity of the Au-Cr alloy layer changes in dependence on the film thickness and is saturated when the film thickness has a value within a range of 400 to 600 Å and it sufficiently exceeds 50% of the saturation value when the film thickness is about 300 Å. The sample pieces described in the Example 6 were prepared, the composition of the reflective layer was fixed to $Au_{85}Cr_{15}$, and the sensitivities were compared using the film thickness as a parameter in order to decide the optimum film thickness of the reflective layer.

Figure 7A:
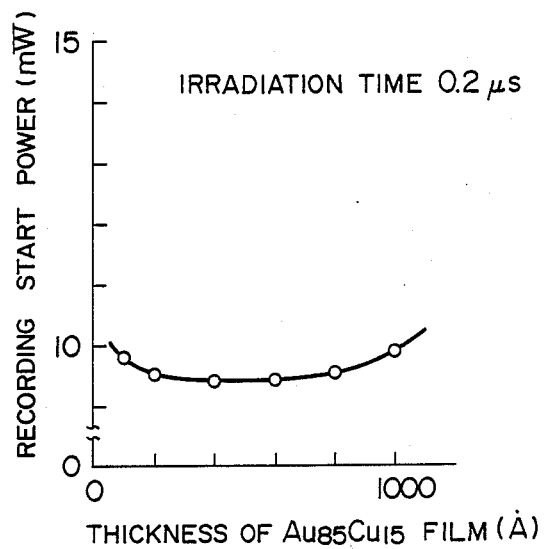
FIGS. 7A and 7B are diagrams showing the relations among the film thickness of the Au-Cr alloy reflective layer of the invention and the recording and erasing sensitivities.
Figure 7B:
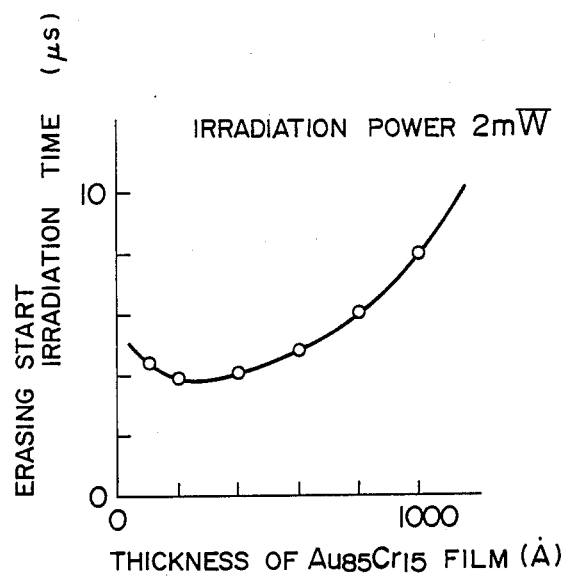

FIGS. 7A and 7B show the results of the experiments. For example, as shown in FIG. 7A, it will be understood that when the irradiation pulse width was set to 0.2 μm, the recording start powers are not so different when the film thickness is within a range of 100 to 1000 Å. On the other hand, as shown in FIG. 7B, it will be understood that when the irradiation power was set to 2 mW, there is a tendency such that the erasing start irradiation time becomes long with an increase in film thickness and this time is influenced by the heat capacity.

Namely, it has been found that by setting the film thickness within a range of 100 to 600 Å, the high recording and erasing sensitivities can be held. This tendency is similarly obtained even when the Cr concentration as a composition of the Au-Cr alloy was set to a value within a range of 2 to 30%.

EXAMPLE 8

The disk using the Au reflective layer and the disk using the reflective layer of the Au-Cr alloy were formed and the repetitive characteristics of the recording and erasing were examined. The optical disk was formed in such a manner that a ZnS layer, an absorptive layer, a ZnS layer, and a reflective layer of Au or $Au_{85}Cr_{15}$ were sequentially laminated on the polycarbonate resin substrate of a diameter φ of 130 mm and a thickness of 1.2 mm and having optical guide tracks, and a protective substrate was adhered on this laminate by use of an ultraviolet light cured resin. The optical disk was dynamically evaluated using the synamic tester. Thus, the following conclusions were derived.

(1) The recording power at which the C/N ratio is above 50 dB was above about 6 mW in the case of using the Au reflective layer and was above about 6.5 mW in the case of using the Au-Cr alloy reflective layer. When comparing the constitution using the Au-Cr alloy reflective layer and the constitution using the Au reflective layer, their recording sensitivities are almost equal.

(2) When the recording power at which the C/N ratio is above 50 dB was selected, the erasing power necessary to set the erasing ratio to a value above 40 dB was above about 12 mW in the case of using the Au reflective layer and was above about 9 mW in the case of using the Au-Cr alloy reflective layer.

(3) When the recording and erasing operations were repeatedly performed under the power condition such that the C/N ratio is above 50 dB and the erasing ratio is above 40 dB, the repetitive life of above hundred thousand times was confirmed in both cases where the Au reflective layer was used and where the Au-Cr alloy reflective layer was used.

(4) The results of the above items (1) to (3) were not changed even when the Cr concentration as a composition of the Au-Cr alloy was set to a value within a range of 2 to 30%.

As will be understood from the above-mentioned results, in the optical disk with the constitution described in the Example 8, the irradiating beam in the erasure process needs a larger energy than that of the irradiating beam in the recording process. Therefore, it is advantageous to use the Au-Cr alloy reflective layer as the reflective layer rather than the use of the Au reflective layer because the recording and erasing operations can be repeatedly performed with a smaller power as a total power.

EXAMPLE 9

The environment test was performed using the optical disk with the constitution shown in the Example 8. In each disk, the signal was recorded into the tracks into and from which the recording and erasing operations had been repeatedly performed hundred thousand times and the C/N ratio was measured. Next, this disk was put in the air conditioned room at 80° C. and 80% RH. This disk was taken out of this room after two months and the C/N ratio was again measured. Thus, it has been found that even in the cases where the reflective layer was made of the thin Au film and where the reflective layer was made of the thin Au-Cr alloy film, the change in the C/N ratio was so small to be −0.5 to −1.5 dB that it can be ignored.

As described above, according to the present invention, a rewritable optical information recording medium having the high sensitivity and the excellent heat resisting and moisture resisting properties can be provided.

We claim:

1. A reversible optical information recording medium comprising:
   a substrate;

an absorptive layer, overlying the substrate, which absorbs a light of a wavelength of an irradiating laser beam for any one of recording, reproducing, and erasing and which may be reversibly switched to a state having different optical properties;

a reflective layer, overlying the absorptive layer, for reflecting a considerable portion of the light of an irradiating laser beam; and a spacer layer interposed between said absorptive layer and said reflective layer, wherein said reflective layer comprises a thin film of an Ni-Cr alloy or an Au-Cr alloy.

2. A recording medium according to claim 1, wherein said absorptive layer comprises a material which can reversibly cause a phase transition between a crystalline phase and an amorphous phase upon irradiation by a laser beam, and said reflective layer comprises a thin film of an Ni-Cr alloy or an Au-Cr alloy of a thermal diffusivity lower than that of Au or Al.

3. A recording medium according to claim 1, wherein said reflective layer is composed of an Ni-Cr alloy and when it is assumed that the composition of said alloy is $Ni_{100-x}Cr_x$, x is set to a value within a range of $10 \leq x \leq 90$.

4. A recording medium according to claim 3, wherein said x is set to a value within a range of $20 \leq x \leq 80$.

5. A recording medium according to claim 1, wherein a thickness of said thin Ni-Cr alloy film is set to a value within a range of 200 to 600 Å.

6. A recording medium according to claim 1, wherein said reflective layer is composed of an Au-Cr alloy and when it is assumed that the composition of said alloy is $Au_{100-y}Cr_y$, said y is set to a value within a range of $2 \leq y \leq 30$.

7. A recording medium according to claim 6, wherein said y is set to a value within a range of $10 \leq y \leq 20$.

8. A recording medium according to claim 1, wherein a thickness of said thin Au-Cr alloy film is set to a value within a range of 100 to 600 Å.

9. A recording medium according to claim 2, wherein said reflective layer comprises an Ni-Cr alloy film.

10. A recording medium as in claim 9 wherein said Ni-Cr alloy film has a composition of $Ni_{100-x}Cr_x$ and x is set to a value in the range of $10 \leq x \leq 90$.

11. A recording medium according to claim 10, wherein x is set to a value within a range of $20 \leq x \leq 80$.

12. A recording medium according to claim 9, wherein a thickness of said thin Ni-Cr alloy film is 200 to 600 Å.

13. A recording medium according to claim 2, wherein said reflective layer comprises an Au-Cr alloy.

14. A recording medium according to claim 13 wherein said Au-Cr alloy film has a composition of $Au_{100-y}Cr_y$ and y is set to a value in the range of $2 \leq y \leq 30$.

15. A recording medium according to claim 14, wherein y is set to a value within a range of $10 \leq y \leq 20$.

16. A recording medium according to claim 13 wherein a thickness of said thin Au-Cr alloy film is set to a value within a range of 100 to 600 Å.

* * * * *